United States Patent Office 3,278,428
Patented Oct. 11, 1966

3,278,428
GREASE COMPOSITION
John F. Hedenburg, Cheswick, and Chester S. Tempalski, Pittsburgh, Pa., assignors to Gulf Research & Development Company, Pittsburgh, Pa., a corporation of Delaware
No Drawing. Filed Dec. 1, 1964, Ser. No. 415,191
7 Claims. (Cl. 252—25)

This invention relates to an improved lubricating composition and more particularly to a lubricant having the consistency of a grease suitable for high temperature lubrication.

The trend in design of modern aircraft has accentuated the need for a lubricant having the consistency of a grease which will lubricate anti-friction bearings operating at high rotational speeds and high temperatures. Considerable progress has been made in recent years in producing improved thickened lubricants for aircraft. For example, lubricating compositions having the consistency of a grease are now available for lubricating bearings operating at 10,000 to 20,000 revolutions per minute at temperatures up to about 400° F. However, great difficulty has been encountered in producing a lubricating composition having the consistency of a grease which will effectively lubricate bearings operating at speeds of 10,000 to 20,000 revolutions per minute and at temperatures up to about 600° F. for prolonged periods of time.

Since many of the lubricating characteristics of a thickened lubricant are imparted to the lubricant by the lubricating oil used in preparing the lubricant, a lubricating oil is required which is thermally stable at temperatures in the order of 600° F. While some lubricating compositions having the consistency of a grease have been prepared by thickening mineral lubricating oils, especially hydrotreated mineral lubricating oils, the volatility of mineral lubricating oils is such that as a general rule they do not give adequate lubrication at temperatures in the order of 600° F. over prolonged periods of time. Synthetic oils are substantially more resistant to thermal degradation than mineral oils. Synthetic oils, particularly the polyorganosiloxanes known as the silicone oils in addition to being more resistant to thermal degradation than mineral oils also have high viscosity indices making their use at high and ambient temperatures especially desirable. Thus, the lubricating oil employed in the composition of this invention is a synthetic lubricating oil.

Even though the synthetic lubricating oils have given improved lubricants, some difficulty has been encountered in producing a thickened synthetic lubricating oil which will give adequate lubrication of bearings operating at temperatures of 600° F. and speeds up to 20,000 revolutions per minute over a prolonged period of time.

We have discovered that a lubricating composition having improved lubricating characteristics for an extended period of time when used to lubricate bearings operating at temperatures up to about 600° F. and speeds of 10,000 to 20,000 revolutions per minute can be obtained by incorporating into a synthetic lubricating oil in oil thickening proportions the solid residual pyrolysis product of mercuric thiocyanate. Thus, the improved lubricating composition of our invention comprises a dispersion in a synthetic lubricating oil of a sufficient amount to thicken the lubricating oil to a grease consistency of the pyrolysis product of mercuric thiocyanate.

Mercuric thiocyanate is available commercially so that neither the compound per se nor its method of preparation constitutes any portion of the invention. Mercuric thiocyanate is a white powder having a molecular weight of 317. Upon the application of heat, mercuric thiocyanate decomposes without melting. Mercuric thiocyanate upon decomposing swells to many times its original volume. The decomposition product is an extremely fluffy light yellow product. Pyrolysis of mercuric thiocyanate can be conducted at any desired elevated temperature such as at a temperature of 800° to 1200° F. Heating is continued until complete pyrolysis is effected as evidenced by no further noticeable change in the product and no detectable emission of gas or vapor. While we do not wish to be limited to any theory with respect to what occurs when mercuric thiocyanate is thermally decomposed, we believe that the resulting product is a mixture of compounds, at least one of which is a chain polymer having an empirical formula $(C_6H_3N_9)_n$ and represented structurally by the following formula where $n$ is a number from 3 to 21.

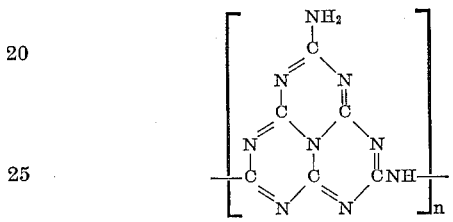

According to C. E. Redemann and H. J. Lucas, Journal of the American Chemical Society, volume 62, pages 843–844 (1940), the product formed upon the pyrolysis of vacuum dried mercuric thiocyanate corresponds closely to a compact condensation product, triangular in form, with twenty-one nuclei and a molecular formula of $C_{126}H_{21}N_{175}$. Regardless of the theory with respect to what happens during the pyrolysis of mercuric thiocyanate, we have found that the pyrolysis product when incorporated in a synthetic lubricating oil in an amount sufficient to give a composition having the consistency of a grease results in a composition having a surprisingly long performance life.

The amount of the pyrolysis product of mercuric thiocyanate which we use may vary depending upon the particular lubricating base employed and upon the characteristics desired in the ultimate composition. In any event, the amount of the pyrolysis product used is an amount sufficient to thicken the lubricating oil to a grease consistency. In general this amount comprises about 10 to about 40 percent by weight of the total composition.

The synthetic lubricating oil which is employed in the composition of the invention is selected from the group consisting of the liquid polyorganosiloxanes having a high phenyl content and diphenylmethylsilyl end groups and polyaryl ethers. The polyorganosiloxanes can be obtained by hydrolyzing and polymerizing a mixture of diphenylmethylchlorosilane, dimethyldichlorosilane and diphenyldichlorosilane preferably in a ratio of 1:1:1, respectively, according to procedures known to those familiar with the art. While the polyorganosiloxanes are generally a mixture of polymers, a general formula representing the polymer mixture by an ideal molecule is as follows:

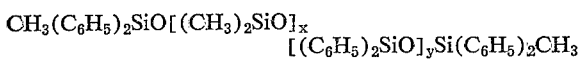

where $x$ and $y$ can be from 1 to 10 or more. An ideal molecule of a polyorganosiloxane having diphenylmethylsilyl end groups and a molecular weight of 954 is represented by the formula

Exemplary of the polyaryl ethers which can be used are the polyphenyl ethers, i.e., m-bis(m-phenoxyphenoxy)benzene and m-bis(m-phenoxyphenoxy)phenyl ether.

The lubricating composition of this invention can contain conventional lubricant additives, if desired, to improve other specific properties of the lubricant without departing from the scope of the invention. Thus, the lubricating composition can contain an auxiliary thickening agent, a filler, a corrosion and rust inhibitor, an extreme pressure agent, an anti-oxidant, a metal deactivator, a dye and the like. Whether or not such additives are employed and the amounts thereof depend to a large extent upon the severity of the conditions to which the composition is subjected and upon the stability of the synthetic lubricating oil base in the first instance. Since the polyorganosiloxanes, for example, are in general more stable than mineral oils, they require the addition of very little, if any, oxidation inhibitor. When such conventional additives are used they are generally added in amounts between about 0.01 and abmout 5 percent by weight based on the weight of the total composition.

In those instances when an auxiliary thickening agent such as finely-divided amorphous silica, bentonite-organic base compound or esterified siliceous solid is employed, it is added in amounts of about 0.5 to about 5 percent by weight.

In compounding a composition of the present invention, various mixing and blending procedures may be used. According to one embodiment of the invention, the synthetic lubricating oil, the pyrolysis product of mercuric thiocyanate together with conventional lubricant additives, if desired, are mixed together at room temperature for a period of about 10 to 30 minutes to form a slurry. During this initial mixing period some thickening is evidenced. Some lumps may be formed. The slurry thus formed is then subjected to a conventional milling operation in a ball mill, a colloid mill, homogenizer or similar device used in compounding greases to give the desired degree of dispersion.

In order to illustrate the lubricating characteristics of a grease composition of the invention when used to lubricate bearings operating at 600° F. and at rotational speeds of 20,000 revolutions per minute, Pope spindles were used in a test procedure similar to that outlined by the Coordinating Research Council Tentative Draft (July 1954), "Research Technique for the Determination of Performance Characteristics of Lubricating Grease in Antifriction Bearings at Elevated Temperatures," CRC Designation L–35. According to the CRC L–35 test method, the test bearings are packed with 3.5 cc. (or equivalent weight) of grease. Because of the extremely short life of bearings packed with 3.5 cc. of grease, the present evaluations were made by packing the bearings completely full with about 6 to 8 grams of grease and using either a standard end cap with no additional grease or a special end cap holding a reservoir of about 10 grams of additional grease. The bearing assembly containing an eight-ball SAE No. 204 ball bearing is mounted on a horizontal spindle and is subjected to a radial load of 5 pounds. The portion of the spindle upon which the test bearing assembly is located is encased in a thermostatically controlled oven. By this means the temperature of the bearing can be maintained at a desired elevated temperature which in the tests reported hereinafter was 600° F. The spindle is driven by a constant belt-tension motor drive assembly, capable of giving spindle speeds of 20,000 revolutions per minute. The spindle is operated on a cycling schedule consisting of a series of periods, each period consisting of 20 hours running time and 4 hours shutdown time. The test continues until the lubricant fails. The lubricant is considered to have failed when any one of the following conditions occurs, (1) spindle input power increases to a value approximately 300 percent above the steady state condition at the test temperature; (2) an increase in temperature at the test bearing of 20° F. over the test temperature during any portion of a cycle; or (3) the test bearing locks or the drive belt slips at the start or during the test cycle.

The lubricating oil used in preparing the lubricating compositions shown in Table I is a synthetic oil known as QF–6–7024 Fluid which is marketed by Dow Corning Corporation. This fluid is considered to be a methylphenylsiloxane polymer wherein the "end" silicon atoms are substituted to a high degree by two phenyl groups and one methyl group. The material is highly resistant to radiation. QF–6–7024 Fluid has as typical characteristics a viscosity at 100° F. of about 930 to 1030 SUS, a viscosity at 210° F. of about 90 to 100 SUS, a viscosity index of about 108 to 110 and a pour point of +10° to +20° F. It is believed that the types of side chains present and their approximate molar percentages (in parentheses) in QF–6–7024 are phenyl (65), methyl attached through silicon to methyl (25) and methyl attached through silicon to phenyl (10). An ideal molecule of a polyorgano siloxane having this analysis is as follows:

$$CH_3(C_6H_5)_2SiO[(CH_3)_2SiO]_2$$
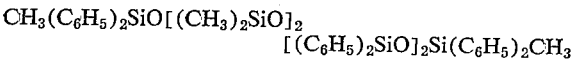
$$[(C_6H_5)_2SiO]_2Si(C_6H_5)_2CH_3$$

The pyrolysis of mercuric thiocyanate used in preparing the illustrative compositions of the invention was prepared according to the following procedure: A 4000 ml. Pyrex beaker cut to a height of 3½ inches was placed on a hot plate, the surface temperature of which was 1000°±100° F. Into the beaker, 20 grams of mercuric thiocyanate were added slowly. Immediate partial pyrolysis of mercuric thiocyanate produced a black cored yellow serpent-like elongation. Upon continued heating of the partially pyrolyzed product with occasional stirring, a completely pyrolyzed fluffy light yellow product was obtained. The completely pyrolyzed mercuric thiocyanate thus obtained had a melting point above 450° C.

The "Cab-O-Sil" employed in preparing the compositions shown in Table I is a finely-divided amorphous silica marketed by Godfrey L. Cabot, Inc. This silica is a submicroscopic particulate silica prepared in a hot gaseous environment (1100° C.) by the vapor-phase hydrolysis of a silicon compound. On a moisture-free basis, this silica is 99.0 to 99.7 percent silicon dioxide which is practically free from contaminating metallic salts. Gravimetric analyses fail to detect the presence of any calcium or magnesium. The iron content has been found to be about 0.004 percent and volatile matter removed on ignition at 1000° C. amounts to less than 1 percent. "Cab-O-Sil" is an extremely fine silica with particles ranging in size from 0.15 to 0.020 micron.

In preparing the illustrative lubricating compositions, the oil, the pyrolysis product of mercuric thiocyanate and the silica were mixed at room temperature for a period of 10 to 30 minutes. The slurry thus formed was passed twice through a Premier colloid mill set at a stator-rotor clearance of 0.0015 inch. The approximate make-up and properties of the thickened lubricating compositions thus prepared are set forth in Table I.

*Table I*

| Composition, percent by weight | A | B |
|---|---|---|
| Lubricating Oil, QF–6–7024 | 92.6 | 85.7 |
| Pyrolysis product of mercuric thiocyanate | 3.7 | 11.8 |
| Cab-O-Sil | 3.7 | 2.5 |
| Inspection: | | |
| Penetration D-1403: | | |
| Unworked (Conv. to D217) | 313 | 362 |
| Worked (Conv. to D217) | 309 | 366 |
| Dropping Point, ° F | 700+ | 700+ |
| Performance Life, Hours 20,000 r.p.m. and 600° F | [1] 75,99 | 105 |

[1] Results of two tests.

The long performance life of compositions of the invention at a high rotational speed and a high temperature is self-evident from the above data.

Other lubricating compositions within the scope of the invention are illustrated in Table II. The polyaryl ethers show in Table II have the following typical characteristics.

|  | (1) | (2) | (3) |
|---|---|---|---|
| Viscosity, SUS: | | | |
| At 100° F | 1,567 | 1,691 | 8,565 |
| At 210° F | 70 | 71 | 118 |
| Pour Point,° F | +35 | +40 | +70 |

(1) m-Bis(m-phenoxyphenoxy)benzene.
(2) Bis(phenoxyphenoxy)benzene (mixed isomers).
(3) Bis-m(m-phenoxyphenoxy)phenyl ether.

*Table II*

| Composition, percent by weight | C | D | E | F | G | H | I | J |
|---|---|---|---|---|---|---|---|---|
| QF-6-7024 | 87 | | | | | | 75 | |
| Polyaryl Ether: | | | | | | | | |
| m-Bis(m-phenoxyphenoxy)benzene | | 85 | | | 81 | | | |
| Bis(phenoxyphenoxy)benzene (mixed isomers) | | | 83 | | | 80 | | 60 |
| Bis-m(m-phenoxyphenoxy)phenyl ether | | | | 82 | | | | |
| Pyrolysis product of mercuric thiocyanate | 10 | 12 | 14 | 16 | 18 | 19.5 | 25 | 40 |
| Cab-O-Sil | 3 | 3 | 3 | 2 | 1 | 0.5 | | |

While our invention has been described with reference to various specific examples and embodiments, it will be understood that the invention is not limited to such examples and embodiments and may be variously practiced within the scope of the claims hereinafter made.

We claim:

1. A lubricating composition comprising a dispersion in a major amount of a synthetic lubricating oil selected from the group consisting of liquid polyorgano siloxanes having diphenylmethylsilyl end groups and polyaryl ethers of a sufficient amount to thicken the lubricating oil to a grease consistency of the solid residual pyrolysis product of mercuric thiocyanate.

2. The lubricating composition of claim 1 wherein the pyrolysis product of mercuric thiocyanate comprises about 10 to about 40 percent by weight of the total composition.

3. A lubricating composition comprising a dispersion in a major amount of a liquid polyorganosiloxane having diphenylmethylsilyl end groups of about 10 to about 40 percent by weight of the solid residual pyrolysis product of mercuric thiocyanate and about 0.5 to about 5 percent by weight of finely-divided silica.

4. A lubricating composition comprising a dispersion in a major amount of a liquid polyphenyl ether of about 10 to about 40 percent by weight of the solid residual pyrolysis product of mercuric thiocyanate and about 0.5 to about 5 percent by weight of finely-divided silica.

5. A lubricating composition comprising a dispersion in a major amount of a synthetic lubricating oil selected from the group consisting of liquid polyorganosiloxanes having diphenylmethylsilyl end groups and polyaryl ethers of a sufficient amount to thicken the lubricating oil to a grease consistency of the solid residual pyrolysis product of mercuric thiocyanate obtained by heating said mercuric thiocyanate at a temperature of about 800° to about 1200° F. for a time sufficient to effect complete pyrolysis.

6. A lubricating composition comprising a dispersion in a major amount of a liquid polyorganosiloxane having diphenylmethylsilyl end groups of about 10 to about 40 percent by weight of the solid residual pyrolysis product of mercuric thiocyanate obtained by heating said mercuric thiocyanate at a temperature of about 900° to about 1100° F. for a time sufficient to effect complete pyrolysis and about 0.5 to about 5 percent by weight of finely-divided silica.

7. A lubricating composition comprising a dispersion in a major amount of liquid polyphenyl ether of about 10 to about 40 percent by weight of the solid residual pyrolysis product of mercuric thiocyanate obtained by heating said mercuric thiocyanate at a temperature of about 900° to about 1100° F. for a time sufficient to effect complete pyrolysis and about 0.5 to about 5 percent by weight of finely-divided silica.

References Cited by the Examiner

UNITED STATES PATENTS

| 3,089,875 | 5/1963 | Schroeder | 44—7 |
| 3,108,957 | 10/1963 | Murray et al. | 252—25 |

DANIEL E. WYMAN, *Primary Examiner.*

I. VAUGHN, *Assistant Examiner.*